United States Patent
Zacharia et al.

(10) Patent No.: US 12,086,170 B2
(45) Date of Patent: Sep. 10, 2024

(54) SYSTEMS AND METHODS FOR SEARCHING CONTENT TO QUERIES

(71) Applicant: FMR LLC, Boston, MA (US)

(72) Inventors: Ron Zacharia, Boston, MA (US); Yen-Min Huang, Boston, MA (US); Henry Gengiti, Boston, MA (US); Derek Kaschl, Boston, MA (US); Ashley Ducharme, Boston, MA (US)

(73) Assignee: FMR LLC, Boston, MA (US)

( * ) Notice: Subject to any disclaimer, the term of this patent is extended or adjusted under 35 U.S.C. 154(b) by 83 days.

(21) Appl. No.: 17/980,909

(22) Filed: Nov. 4, 2022

(65) Prior Publication Data

US 2024/0152535 A1    May 9, 2024

(51) Int. Cl.
  *G06F 16/332* (2019.01)
  *G06F 16/35* (2019.01)
  *G06F 40/30* (2020.01)

(52) U.S. Cl.
  CPC .......... *G06F 16/3329* (2019.01); *G06F 16/35* (2019.01); *G06F 40/30* (2020.01)

(58) Field of Classification Search
  CPC .............. G06F 16/245; G06F 16/2455; G06F 16/24578; G06F 16/248; G06F 16/285; G06F 16/3329; G06F 16/35; G06F 16/9535; G06F 40/30
  See application file for complete search history.

(56) References Cited

U.S. PATENT DOCUMENTS

| | | | |
|---|---|---|---|
| 10,951,658 B2 | 3/2021 | Putz et al. | |
| 2006/0080107 A1* | 4/2006 | Hill | G10L 15/1822 704/275 |
| 2008/0294637 A1* | 11/2008 | Liu | G06Q 30/0601 705/26.1 |
| 2014/0280169 A1* | 9/2014 | Liu | G10L 15/1815 707/739 |
| 2016/0253596 A1* | 9/2016 | Goth, III | G09B 7/02 706/12 |
| 2019/0251087 A1* | 8/2019 | Lin | G06F 16/953 |
| 2019/0371299 A1* | 12/2019 | Jiang | G10L 15/197 |
| 2020/0126136 A1* | 4/2020 | Rajbhoj | G06F 40/30 |
| 2020/0311738 A1* | 10/2020 | Gupta | G06F 16/22 |

(Continued)

*Primary Examiner* — Robert W Beausoliel, Jr.
*Assistant Examiner* — Cheryl M Shechtman
(74) *Attorney, Agent, or Firm* — Cesari and McKenna, LLP

(57) ABSTRACT

A computer implemented method is provided for automatically determining a response to an input query. The method includes searching at a first stage a data repository using the input query. The data repository is configured to store historical queries and their corresponding responses. The search is adapted to determine a plurality of historical queries related to the input query and historical responses corresponding to the related historical queries. The method also includes clustering the plurality of historical responses into one or more response groups, where each response group includes one or more similar historical responses. The method additionally includes searching at a second stage a content management system (CMS) to determine if there is at least one similar response to at least one historical response in each response group. The CMS is configured to store standard responses to anticipated queries.

15 Claims, 4 Drawing Sheets

(56) References Cited

U.S. PATENT DOCUMENTS

2023/0106590 A1* 4/2023 Di Fabbrizio ........ G06F 16/906
 705/26.63
2023/0252058 A1* 8/2023 Radhakrishnan ... G06F 16/3335
 707/737

* cited by examiner

SYSTEMS AND METHODS FOR SEARCHING CONTENT TO QUERIES

BACKGROUND

Technical Field

This application generally relates to systems, methods and apparatuses, including computer program products, for automatically determining responses to queries by intelligently searching structured and unstructured content.

Background Information

Many enterprises routinely receive and respond to thousands of Requests for Proposal (RFPs) from clients and prospective clients each year. Each RFP can include hundreds of questions and may take multiple staff several weeks to respond, often involving multiple rounds of revision, which may generate varying responses that are even contradictory in nature. In addition, an enterprise relies on a set of manually curated "best responses" to typical RFP questions stored in a content management system to help inform the team's answers to new RFP questions. However, such a content management system typically uses a manual content tagging process to manipulate search results. This human-driven process of classification and prioritization of content is inefficient and can lead to mixed search outcomes. As an example, if a sales team needs to find the best high-quality response to a certain question, the team often needs to manually search through similar questions that have been answered multiple times in the past with many variations of the same question asked and many variations of responses given. These past questions and answers can be buried in thousands of artifacts/documents. In addition, multiple systems and databases may exist to store questions and responses. Even though there are content management systems that automatically tag responses based on what users search for and/or what they click/select, such automated tagging is also very unreliable at least because it leads to inaccuracy due to random patterns on how users search, select, and modify content.

Therefore, there is a need for an automated system for searching and classifying RFP related content to facilitate determination of the most relevant answer to a given RFP question, especially when there are thousands of documents spread across multiple content management systems and/or data repositories.

SUMMARY

The instant application provides a solution that uses a combination of search algorithms and clustering (i.e., grouping) algorithms to determine one or more relevant answers to a given RFP question. In some embodiments, for a new RFP query, the determination system of the instant application searches a repository of stored question-and-answer pairs, clusters similar results together in one or more groups, finds the associated content management records for the groups to augment the responses, and sorts results in order of relevance based on the searching and clustering. The present invention is able to narrow down the selection of possible responses to an RFP query in an automated and easy-to-user manner, thereby reducing the time needed for a sales team to synthesize and cultivate answers for an RFP at hand. In general, the instant application can provide optimal answers to an RFP query without overwhelming the user with too many options.

In one aspect, the present invention features a computer implemented method for automatically determining a response to an input query. The method includes searching at a first stage, by a computing device, a data repository using the input query. The data repository is configured to store historical queries and their corresponding responses. The search is adapted to determine a plurality of historical queries related to the input query and historical responses corresponding to the related historical queries. The method also includes clustering, by the computing device, the plurality of historical responses into one or more response groups, where each response group includes one or more similar historical responses. The method additionally includes searching at a second stage, by the computing device, a content management system (CMS) to determine if there is at least one similar response to at least one historical response in each response group. The CMS is configured to store standard responses to anticipated queries. The method includes associating, by the computing device, a CMS record of the similar response to the corresponding response group by updating the corresponding response group to add the CMS record. The method further includes sorting, by the computing device, the one or more updated response groups in order of relevance based on a plurality of parameters and recommending, by the computing device, the response group that is most relevant from the sorting to respond to the input query.

In another aspect, the present invention features a computer-implemented system for automatically determining a response to an input query. The system includes a server computing device and a memory storing instructions executable by the server computing device. The instructions, when executed, configure the computer-implemented system to provide a first-stage search module, a clustering module, a second-stage search module, a ranking module and a recommendation module. The first-stage search module is configured to search a data repository using the input query. The repository is configured to store historical queries and their corresponding responses. The search is adapted to determine a plurality of historical queries related to the input query and historical responses corresponding to the related historical queries. The clustering module is configured to cluster the plurality of historical responses into one or more response groups, where each response group includes one or more similar historical responses. The second-stage search module configured to (i) search a content management system (CMS) to determine if there is at least one similar response to at least one historical response in each response group, where the CMS is configured to store standard responses to anticipated queries, and (ii) associate a CMS record of the similar response to the corresponding response group by updating the corresponding response group to add the CMS record. The ranking module is configured to sort the one or more updated response groups in order of relevance based on a plurality of parameters. The recommendation module is configured to recommend the response group that is most relevant from the sorting to respond to the input query.

Any of the above aspects can include one or more of the following features. In some embodiments, the input query relates to a Request for Proposal (RFP), the data repository is configured to store historical responses submitted to actual RFP queries, and the CMS is configured to store standard responses prepared for anticipated RFP queries.

In some embodiments, the search at the first stage further comprises directly searching the CMS using the input query to determine one or more related standard responses from the CMS. In some embodiments, the plurality of historical responses from the data repository search are combined with the one or more related standard responses from the CMS search and the clustering is performed on the combined responses. In some embodiments, the search of the CMS at the first stage is performed using a term frequency-inverse document frequency algorithm.

In some embodiments, the search of the data repository at the first stage is performed using a semantic similarity algorithm. In some embodiments, the clustering is performed using a nature language processing (NLP) clustering algorithm. In some embodiments, searching the CMS at the second stage comprises conducting a semantic search to compare the standard responses in the CMS with the at least one historical response in each response group. In some embodiments, each of the data repository and the CMS includes structured data of organized information and unstructured data without predefined schema.

In some embodiments, the plurality of parameters includes one or more of (i) a number of combined historical responses in each response group, (ii) a degree of closeness of the plurality of related historical RFP queries in each response group to the input query, (iii) a creation date of the CMS record in each response group, and (iv) a past RFP due date.

In some embodiments, a user is allowed to filter the updated response groups based on business context to determine more targeted responses.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
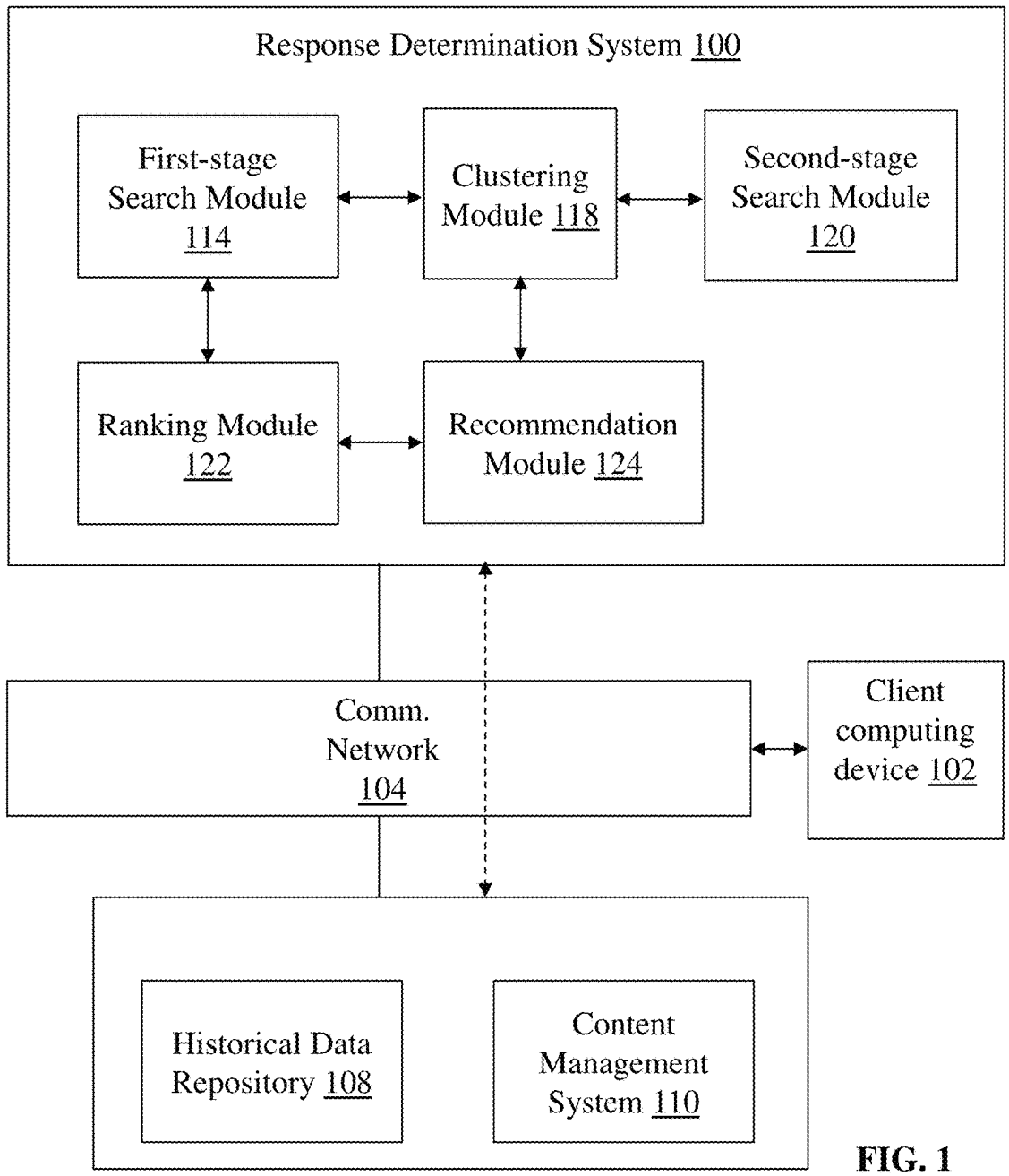
FIG. 1 shows an exemplary diagram of a response determination system, according to some embodiments of the present invention.

FIG. 1 shows an exemplary diagram of a response determination system 100 used in a computing environment 101 for automatically determining one or more responses to an input query, according to some embodiments of the present invention. As shown, the computing environment 101 generally includes at least one client computing device 102, a communication network 104, the response determination system 100, and multiple databases 108, 110.

The client computing device 102 connects to the communication network 104 to communicate with the response determination system 100 and/or the databases 108, 110 to provide inputs (e.g., an input query) and receive outputs (e.g., one or more recommended responses to the input query). For example, the computing device 102 can provide a detailed graphical user interface (GUI) that allows a user to input queries and display optimal responses using the analysis methods and systems described herein. Exemplary computing devices 102 include, but are not limited to, telephones, desktop computers, laptop computers, tablets, mobile devices, smartphones, and internet appliances. It should be appreciated that other types of computing devices that are capable of connecting to the components of the computing system 101 can be used without departing from the scope of invention. Although FIG. 1 depicts a single computing device 102, it should be appreciated that the computing system 101 can include any number of client devices.

The communication network 104 enables components of the computing system 101 to communicate with each other to perform the process of automated response determination. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The response determination system 100 is a combination of hardware, including one or more processors and one or more physical memory modules and specialized software engines that execute on the processor of the response determination system 100, to receive data from other components of the computing environment 101, transmit data to other components of the computing environment 101, and perform functions as described herein. As shown, the response determination system 100 executes a first-stage search module 114, a clustering module 118, a second-stage search module 120, a ranking module 122 and a recommendation module 124. These sub-components and their functionalities are described below in detail. In some embodiments, the various components of the response determination system 100 are specialized sets of computer software instructions programmed onto a dedicated processor in the response determination system 100 and can include specifically-designated memory locations and/or registers for executing the specialized computer software instructions.

Figure 2:
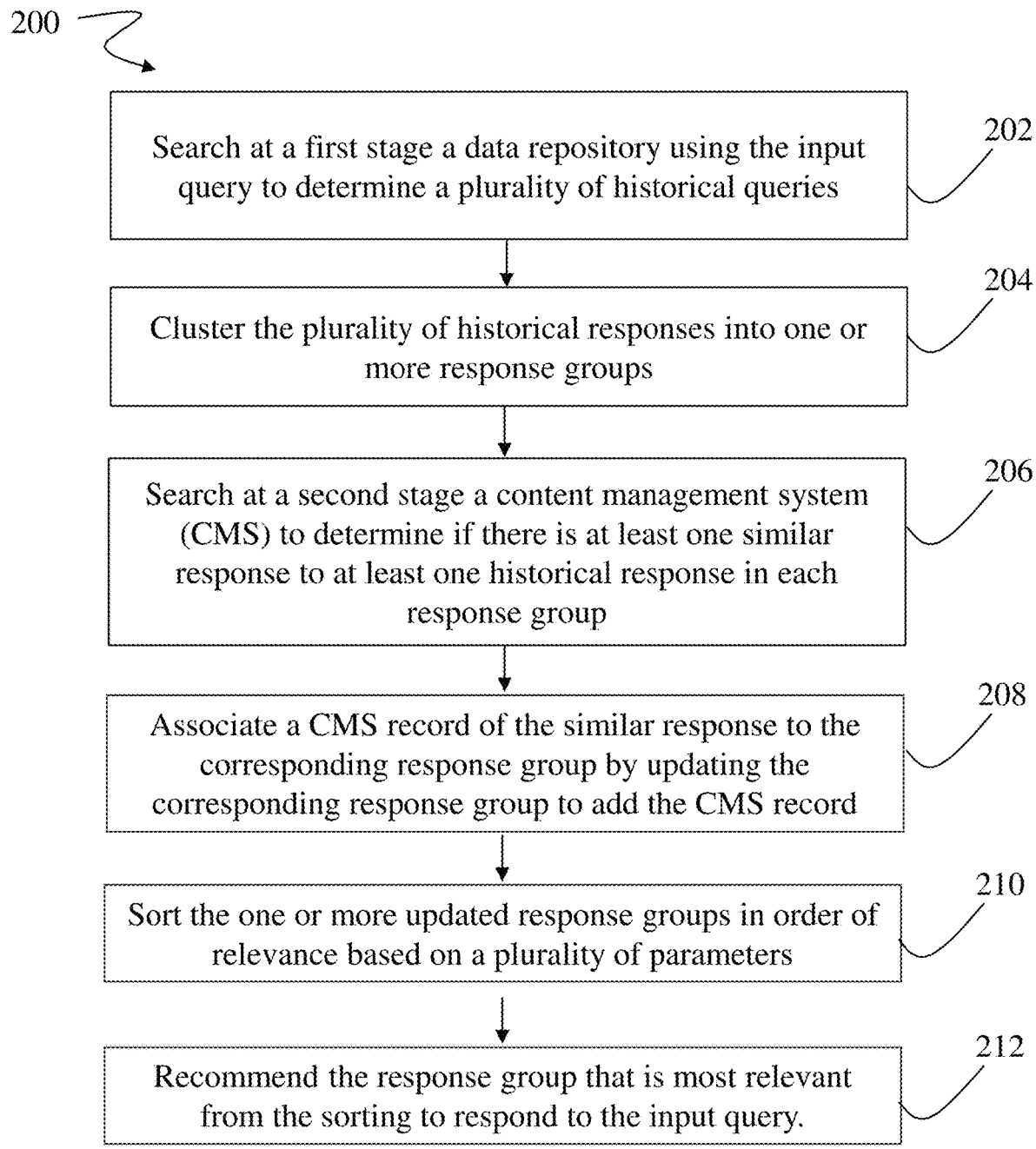
FIG. 2 shows an exemplary computerized process for automatically determining responses to input queries utilizing the response determination system of FIG. 1, according to some embodiments of the present invention.

Each of the databases 108, 110 is a computing device (or in some embodiments, a set of computing devices) that is coupled to and in communication with the response determination system 100 and is configured to provide, receive and store various types of data received and/or created for performing automatic response determination to input queries, as described below in detail. In some embodiments, all or a portion of the databases 108, 110 are integrated with the response determination system 100 or located on a separate computing device or devices. For example, the database 108 can comprise one or more databases, such as MySQL™ available from Oracle Corp. of Redwood City, California. In some embodiments, the database 108 is a historical data repository configured to store historical responses to actual historical queries. The data stored in the historical data repository 108 can include unstructured data of question-and-answer pairs without predefined schema. In some embodiments, the database 110 is a content management system (CMS) configured to store standard responses to anticipated queries along with any related details (e.g., deal information, marketing data, creation dates, times used, updated statistics, etc.) in individual CMS records. Therefore, the data stored in the CMS 110 includes structured data of organized information. For example, in the context of RFPs, the historical data repository 108 is configured to store historical responses actually submitted to historical RFP queries, and the CMS 110 is configured to store standard responses and related data to anticipated RFP queries prepared by a business enterprise in respective ones of CMS records. In some embodiments, each of the history data repository 108 and the CMS 110 includes both structured data of organized information and unstructured data without predefined schema. The historical data repository 108 can include structured data such as company name, company size, company industry, date of past RFPs, deal team of past RFPs, and consultants involved in past RFPs. The CMS 100 can include multiple CMS records, where each CMS record can have attributes such as response text, title, standard queries, and structured data like creation date, times used etc. FIG. 2 shows an exemplary computerized process 200 for automatically determining optimal responses to input queries utilizing the response determination system 100 of FIG. 1, according to some embodiments of the present invention. The determination process 200 generally includes two search stages involving searching both the historical data repository 108 that stores actual historical responses to historical queries and the CMS 110 that stores standard response to anticipated queries and other details in individual records. Thus, the two-stage search process 200 can find responses that may not be easily determined from just a single stage search of one data source.

During the first stage (step 202), the first-stage search module 114 of the response determination system 100 searches the historical data repository 108 using an input query. As explained above, the historical data repository 108 is configured to store historical queries and their corresponding responses, such as in query-and-response pairs. In some embodiments, the input query includes search terms related to a new Request for Proposal (RFP). An exemplary RFP query may be "Provide a brief overview of your company and history of your organization including an organizational chart. Please describe any parent/subsidiary/affiliate relationships." The first-stage search is adapted to search the input query against the historical queries stored in the historical data repository 108 and determine one or more historical queries that are related to the input query. For the related historical queries found, the first-stage search module 114 then locates the historical responses in the data repository 108 correlated to these historical queries. For example, the first-stage search can determine historical RFP question-and-answer pairs related to an input query, such as based on the similarity between the input query and historical RFP questions. In some embodiments, the first-stage search module 114 applies a sematic similarity algorithm and/or a term frequency-inverse document frequency search algorithm to determine those historical queries that are similar to the input query. In some embodiments, if the input query has multiple sub-queries, the first-stage search module 114 is configured to parse the input query to extract different combinations of the sub-queries and determine related responses to each of the different combinations.

Optionally, the first-stage search module 114 is configured to directly search the CMS 110 using the input query to determine one or more related standard responses from the CMS 110. As explained above, the CMS 110 is configured to store standard responses to anticipated queries that may or may not be the same as the actual responses used in the past which are stored in the separate historical data repository 108. During this search, the first-stage search module 114 is adapted to search the input query against the anticipated queries stored in the CMS 110 and determine one or more anticipated queries that are related to the input query. For the related standard queries found, the first-stage search module 114 then locates the standard responses in the CMS 110 correlated to these standard queries. In some embodiments, the first stage search module 114 searches the input query against text in one or more of the following attributes associated with CMS records of the CMS 110: (i) anticipated queries, (ii) CMS responses to anticipated queries (e.g., a user may put search keywords in the input query that aren't necessarily full questions, and instead may match with CMS response text), (iii) CMS record title (e.g. searching for keywords like "Company History"), and (iv) CMS ID. The related standard CMS responses can be combined with the related historical responses determined from searching the history data repository 108 for use in the subsequent steps of the process 200. In general, for the direct CMS search, multiple attributes within the CMS records (e.g., response text, title, queries etc.) are available for searching and displayed in the result set for the user to review before the user chooses one or more standard CMS responses for combination with related historical responses. In alternative embodiments, if a CMS record is found as a part of the direct CMS search that cannot be combined with the related historical response, the CMS record can still be shown to the user as a standalone record in the final result set (generated at step 212).

At step 204, the clustering module 118 of the response determination system 100 clusters the one or more historical responses (or historical and standard responses if the CMS 110 is also searched during the first stage 202) into one or more response groups based on the similarities among these responses. Therefore, each response group includes a cluster of responses that are similar to each other. In some embodiments, an artificial intelligence text cluster algorithm (e.g., a density-based spatial clustering of applications with noise (DBSCAN) algorithm or a k-means algorithm) and/or a nature language processing (NLP) clustering algorithm is applied by the clustering module 118 to perform the clustering.

At step 206, a second-stage search for additional similar responses and data is initiated by the second-stage search module 120 of the response determination system 100. More specifically, the second-stage search module 120 attempts to find record(s) in the content management system (CMS) 110 associated with each response group from step 204. In some embodiments, the second-stage search module 120 finds the related CMS records by comparing a representative response from each of the response groups with the standard responses included in the CMS records to determine if there is at least one standard response in the CMS 110 that is similar. In some embodiments, the representative response from a response group is selected by sorting the historical responses in each response group and choosing the response at the top of the sorted list as the representative response. For example, the sorting can be based on (i) the degree of closeness of the input query to the historical queries associated with corresponding ones of the historical responses in the cluster group (i.e., closer matches sorted to top), and/or (ii) RFP due dates of the historical responses in the cluster group (i.e., newer responses sorted to the top).

The purpose of the second-stage search of the CMS is to identify any CMS record that may be the potential source of the actual historical responses of each response group. In some embodiments, the second-stage search module 120 applies a semantic similarity algorithm and/or a term frequency-inverse document frequency search algorithm to compare the standard responses in the CMS with the representative response in a response group to determine a similar standard response and the corresponding CMS record for the entire response group. Once the similar response is found, the second-stage search module 120 can also pull pertinent information related to that response from the CMS record correlated to the response, such as marketing or deal information.

At step 208, if a similar CMS record, including a similar standard response, is found in the CMS 110 for a cluster group generated at step 204, the response determination system 100 proceeds to add the CMS record to the corresponding response group. In some embodiments, the response groups that correlate to the same CMS record are merged into one response group because they are deemed to originate from the same source. In some embodiments, if the CMS record found through the second stage search includes a standard response that is the same as a response found during the first stage, the response determination system 100 does not add that CMS record to the corresponding response group.

In general, such clustering and second-stage searching are advantageous because similar responses are grouped to allow users to easily review similar variants of a particular response (i.e., within the same cluster) while determining different unique response options (i.e., in separate clusters) without overwhelming the user. Further, by associating historical responses with CMS records from the CMS 110, the system 100 allows the user to easily find the official, most recent version of a historical response, if it exists. In addition, such association reduces system complexity by avoiding the need to maintain a mapping of all possible historical RFP queries to a CMS record in the database. Therefore, human administration burden is reduced by avoiding the need for a CMS administrator to continually update the CMS 110. Furthermore, each CMS record can include additional information beyond a response, thereby supplementing each response with details that may influence the decision of whether the response is relevant and/or applicable to the input query at hand. The additional details from a CMS record can also be used to filter related response and/or sort related responses algorithmically using one or more parameters as described below in the subsequent steps of process 200.

At step 210, the ranking module 122 sorts the updated response groups such that the most relevant response group in relation to the input query is at the top of the list and the least relevant response group is at the bottom of the list. In some embodiments, the sorting is performed by the ranking module 122 based on one or more parameters, including the number of responses in a particular response group, the closeness of the queries (associated with the responses in the response group) to the input query, the creation date of the CMS record in each response group and/or a past RFP due date (indicating approximately when a historical query was asked and/or a response was given). For example, the higher the number or responses in a response group and/or the more recent the CMS record in the response group, the more relevant that response group is to the input query.

At step 212, the recommendation module 124, in response to an input query, recommends to a user the response group that is most relevant from the ranked list of response groups generated at step 210. In some embodiments, the recommendation module 124 allows the user to filter the response groups based on business context to determine more targeted responses. For example, a user can filter based on company size, company industry, date of past RFPs, deal team of past RFPs, consultants involved in past RFPs, etc. The data upon which the filters are applied can be data sourced from the related CMS records in the CMS 110 and/or from structured data in the historical data repository 108. Exemplary filters from the historical data repository 108 include company size, company industry, date of past RFPs, deal team of past RFPs, consultants involved in past RFPs, etc. Exemplary filters from the CMS 110 include creation dates of CMS records, applicable markets where CMS records can be used, CMS folders, etc.

In some embodiments, one or more of these filters can be combined and applied algorithmically or using machine learning techniques to influence relevance of results shown. In some embodiments, the recommendation module 124 allows the user to identify entities in historical RFP that may be deal-specific (e.g., client and people names) and anonymize these entities (e.g., replacing the name) in the responses. The recommendation module 124 can accomplish this by parsing questions and answers in a neutral format (e.g. JSON) with source formatting information included and processing the content text to identify and remove sensitive and/or out-of-date information. In some embodiments, sensitive entities and types of sensitive entities are identified through a combination of one or more of black/white lists, NLP named entity recognition, comparison against structured data associated with historical/standard responses, and pattern matching. In some embodiments, the user is able to instruct the response determination system 100 to replace any text in a response found with a new one in order to adapt that response to the new input query.

In some embodiments, the response determination system 100 continuously or periodically updates the historical data repository 108 with recently submitted historical responses correlated with their respective queries. These historical responses and queries can be stored in the historical data repository 108 in multiple formats (e.g. text, JSON, encoded base64 MS Word format etc.), which supports easy search of the repository 108 in the format of any new inquiry. Similarly, the system 100 can continuously or periodically update the CMS 110 with recent records in multiple formats that include standard responses to anticipated queries. In addition to supporting easy search, storing data in multiple formats also supports easy display and easy compatibility and use of content in different applications. For example, storing data in base64 MS Word format allows a user to easily copy and insert an answer from the search results into an MS Word document.

Figure 3:
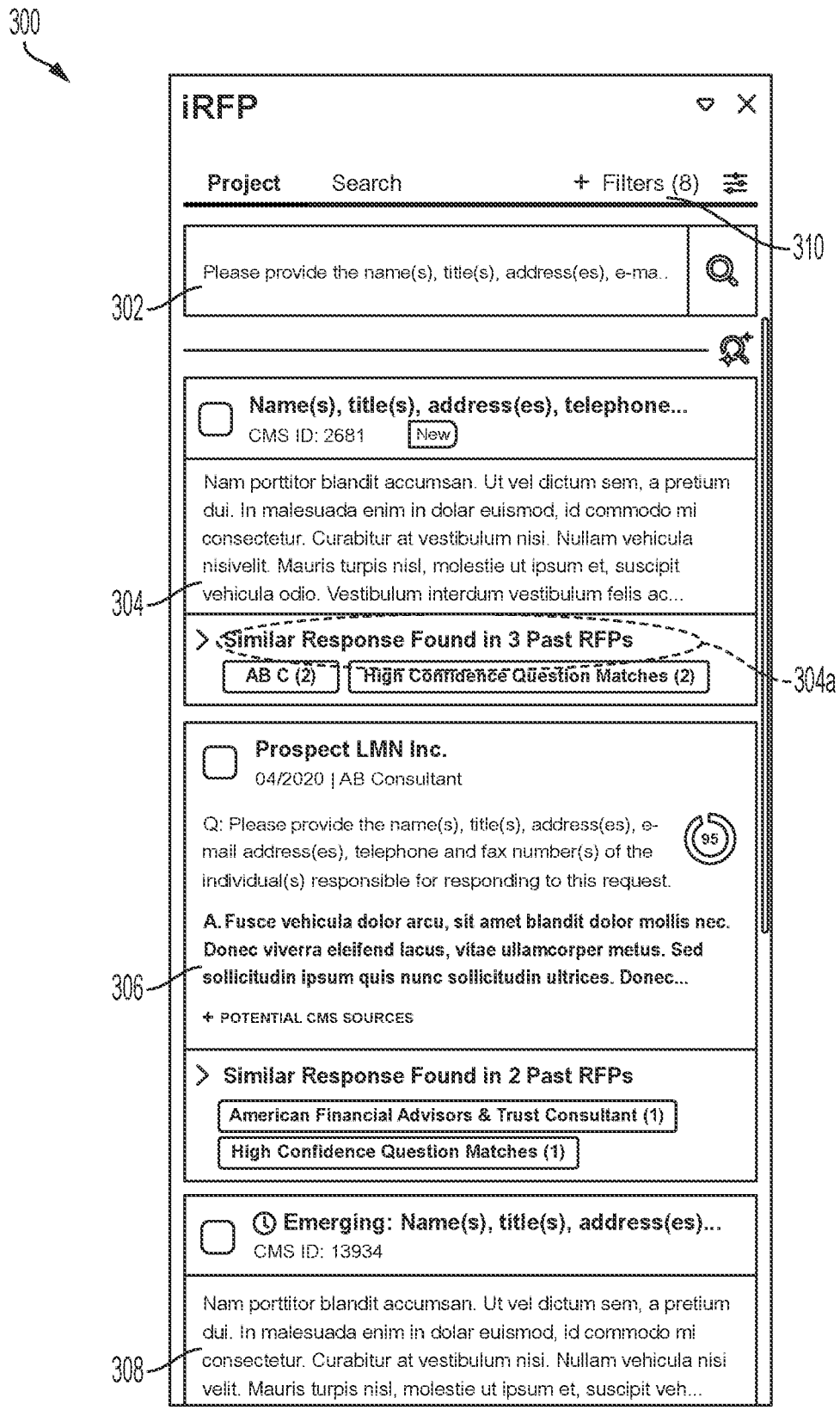
FIG. 3 shows an exemplary graphical user interface (GUI) displaying search results for an illustrative input query generated using the determination process of FIG. 2, according to some embodiments of the present invention.

FIG. 3 shows an exemplary graphical user interface (GUI) 300 displaying search results for an illustrative input query generated using the determination process 200 of FIG. 2, according to some embodiments of the present invention. As shown, the GUI 300 includes an input area 302 where a user can supply an input query as one or more search terms. Based on this input query, the system 100 can generate a list of one or more cluster groups related to the input query. More specifically, the GUI 300 of FIG. 3 shows three cluster groups 304, 306, 308, where each cluster group includes one or more similar responses to the input query. The GUI 300 can also display the number of similar historical responses in each cluster group (e.g., in display area 304a). In some embodiments, these cluster groups 304, 306, 308 are ranked based on one or more parameters using the algorithm described above in step 210 of process 200. For example, cluster group 304 can be deemed to be most relevant while cluster group 306 can be deemed to be least relevant. In some embodiments, a user can filter the responses further using the filter option 310 of the GUI 300.

Figure 4:
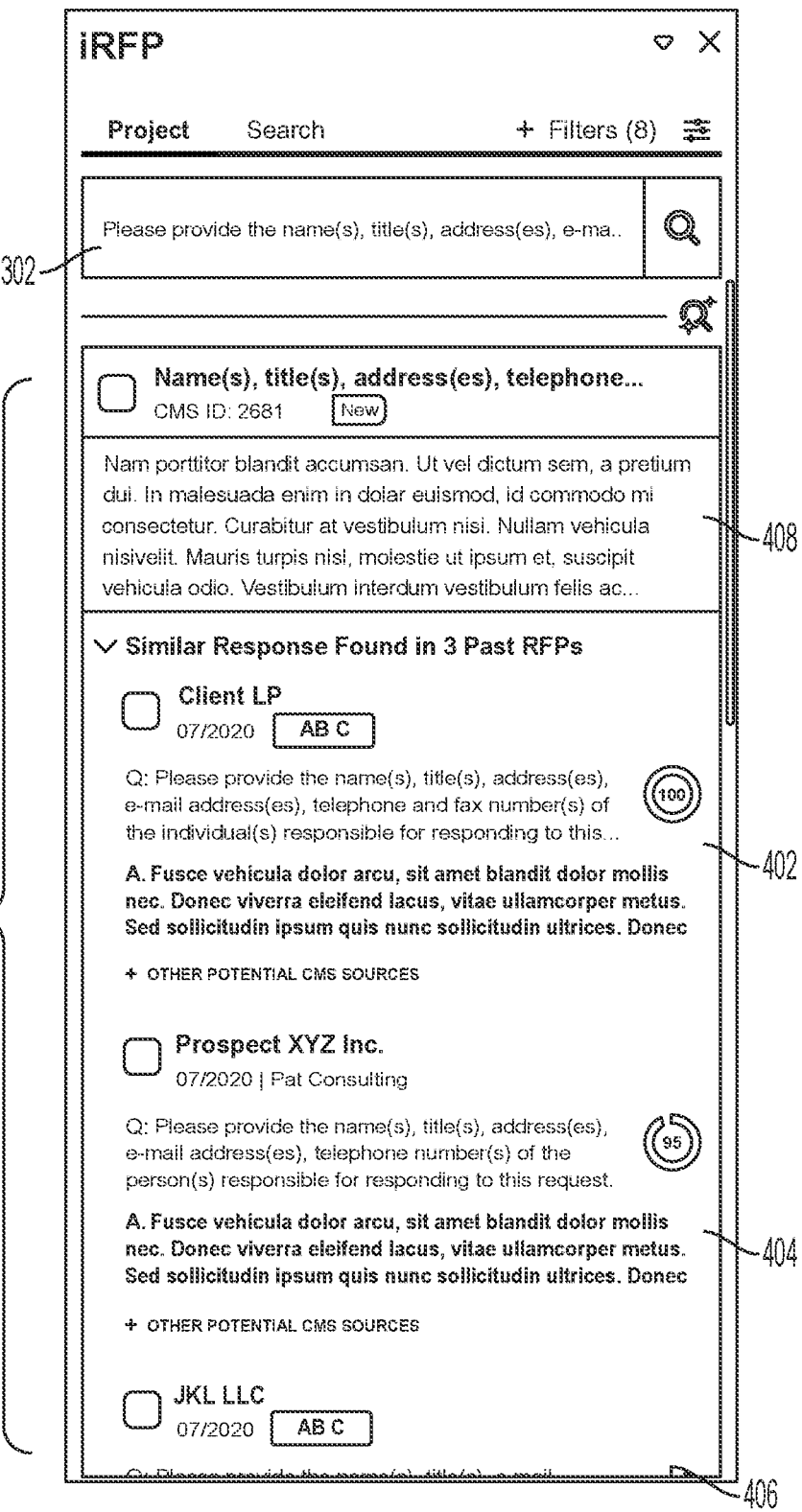
FIG. 4 shows another exemplary graphical user interface (GUI) expanding on the search results of the GUI of FIG. 3, according to some embodiments of the present invention.

FIG. 4 shows another exemplary graphical user interface (GUI) 400 expanding on the search results of the GUI 300 of FIG. 3, according to some embodiments of the present invention. Upon a user choosing (e.g., clicking on the link associated with) the cluster group 304 of the GUI 300, the GUI 400 can be invoked that displays a full list of three similar historical responses 402, 404, 406 in the same cluster group 304. In some embodiments, the responses 402, 404, 406 are ranked based on their similarity scores to the input query (in the input area 302), which can also be displayed in the GUI 400. These similarity scores can be calculated during the first-stage search at step 202 of the determination process 200 of FIG. 2. In some embodiments, the GUI 400 is further configured to display the content of the associated CMS record 408 determined from step 208 of the determination process 200 of FIG. 2, where the CMS record 408 is also a part of the same cluster 304.

Even though the above-described techniques are described in the context of an RFP sales process, a person of ordinary skills in the art understand that the same techniques can be applied in other contexts where corpora of past questions and answers exist to determine closest responses. For example, these techniques can be applied in the context of determining optimal responses gathered by chatbots where transcripts are maintained from past human-human interactions.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer implemented method for automatically determining a response to an input query, the method comprising:
    searching at a first stage, by a computing device, a data repository using the input query, the data repository configured to store historical queries and their corresponding responses, wherein the searching comprises using a semantic similarity algorithm to determine degrees of similarity between the input query and the historical queries, the search being adapted to determine (i) a plurality of historical queries within a similarity threshold in relation to the input query and (ii) historical responses corresponding to the historical queries within the similarity threshold;
    clustering, by the computing device, the historical responses, corresponding to the historical queries within the similarity threshold, into one or more response groups using a nature-language processing (NLP) clustering algorithm, each response group including one or more similar historical responses;
    searching at a second stage, by the computing device, a content management system (CMS) to determine if there is at least one standard response in the CMS similar to at least one historical response in each response group, the CMS configured to store standard responses to anticipated queries;
    associating, by the computing device, a CMS record of the at least one similar standard response to the corresponding response group by updating the corresponding response group to add the CMS record;
    sorting, by the computing device, the one or more updated response groups in order of relevance based on a plurality of parameters; and
    displaying, by the computing device, a first graphical user interface (GUI) listing the one or more updated response groups in the order of relevance, wherein the GUI is configured to recommend the response group that is most relevant from the sorting to respond to the input query,
    wherein each of the one or more updated response groups is expandable via the first GUI to display, in a second GUI, a full list of the responses in the corresponding updated response group, along with similarity scores corresponding to respective ones of the full list of the responses, the similarity scores generated using the semantic similarity algorithm from the first stage, the full list of responses further including one or more of the CMS records determined from the second stage.

2. The computer-implemented method of claim 1, wherein the input query relates to a Request for Proposal (RFP), the data repository is configured to store historical responses submitted to actual RFP queries, and the CMS is configured to store standard responses prepared for anticipated RFP queries.

3. The computer-implemented method of claim 1, wherein the search at the first stage further comprises directly searching the CMS using the input query to determine one or more related standard responses from the CMS.

4. The computer-implemented method of claim 3, further comprising combining the plurality of historical responses from the data repository search with the one or more related standard responses from the CMS search and performing the clustering on the combined responses.

5. The computer-implemented method of claim 3, wherein the search of the CMS at the first stage is performed using a term frequency-inverse document frequency algorithm.

6. The computer-implemented method of claim 1, wherein the semantic search compares the standard responses in the CMS with the at least one historical response in each response group.

7. The computer-implemented method of claim 1, wherein the plurality of parameters include one or more of (i) a number of combined historical responses in each response group, (ii) a degree of closeness of the plurality of related historical RFP queries in each response group to the input query, (iii) a creation date of the CMS record in each response group, and (iv) a past RFP due date.

8. The computer-implemented method of claim 1, further comprising allowing a user to filter the updated response groups based on business context to determine more targeted responses.

9. The computer-implemented method of claim 1, wherein each of the data repository and the CMS includes structured data of organized information and unstructured data without predefined schema.

10. A computer-implemented system for automatically determining a response to an input query, the system comprising:
a server computing device;
a memory storing instructions executable by the server computing device, wherein the instructions, when executed, configure the computer-implemented system to provide:
a first-stage search module configured to search a data repository using the input query, the repository configured to store historical queries and their corresponding responses, wherein the search comprises using a semantic similarity algorithm to determine degrees of similarity between the input query and the historical queries, the search being adapted to determine (i) a plurality of historical queries within a similarity threshold in relation to the input query and (ii) historical responses corresponding to the historical queries within the similarity threshold;
a clustering module configured to cluster the historical responses corresponding to the historical queries within the similarity threshold into one or more response groups using a nature-language processing (NLP) clustering algorithm, each response group including one or more similar historical responses;
a second-stage search module configured to (i) search a content management system (CMS) to determine if there is at least one standard response in the CMS similar to at least one historical response in each response group, the CMS configured to store standard responses to anticipated queries, and (ii) associate a CMS record of the at least one similar standard response to the corresponding response group by updating the corresponding response group to add the CMS record;
a ranking module configured to sort the one or more updated response groups in order of relevance based on a plurality of parameters;
a first graphical user interface (GUI) configured to list the one or more updated response groups in the order of relevance, wherein the first GUI is configured to recommend the response group that is most relevant from the sorting to respond to the input query, and
a second GUI configured to display a full list of the responses in an updated response group selected via the first GUI, along with similarity scores corresponding to respective ones of the full list of the responses, the similarity scores generated using the semantic similarity algorithm from the first stage, the full list of responses further including one or more of the CMS records determined from the second stage.

11. The computer-implemented system of claim 10, wherein the input query relates to a Request for Proposal (RFP), the repository is configured to store historical responses submitted to actual RFP queries, and the CMS is configured to store standard responses prepared for anticipated RFP queries.

12. The computer-implemented system of claim 10, wherein the first-stage search module is further configured to directly search the CMS using the input query to determine one or more related standard responses from the CMS.

13. The computer-implemented system of claim 12, wherein the first-stage search module is further configured to combine the plurality of historical responses from the repository search with the one or more related standard responses from the CMS search, based on which the clustering module performs the clustering.

14. The computer-implemented system of claim 10, wherein the plurality of parameters include one or more of (i) a number of combined historical responses in each response group, (ii) a degree of closeness of the plurality of related historical RFP queries in each response group to the input query, (iii) a creation date of the CMS record in each response group, and (iv) a past RFP due date.

15. The computer-implemented system of claim 10, further comprising a recommendation module configured to allow a user to filter the updated response groups based on business context to determine more targeted responses.

* * * * *